US008918088B1

(12) United States Patent
Thodupunoori et al.

(10) Patent No.: US 8,918,088 B1
(45) Date of Patent: Dec. 23, 2014

(54) METHODS AND APPARATUS FOR DELIVERING TARGETED ADVERTISING FOR RADIO LISTENERS (75) Inventors: Santhosh Kumar Thodupunoori, San Jose, CA (US); Sridharan Muthuswamy, Cupertino, CA (US); Tony Johansson, San Jose, CA (US)

(73) Assignee: Tellabs Operations, Inc., Naperville, IL (US)

( * ) Notice: Subject to any disclaimer, the term of this patent is extended or adjusted under 35 U.S.C. 154(b) by 135 days.

(21) Appl. No.: 13/556,051

(22) Filed: Jul. 23, 2012

(51) Int. Cl.
*H04M 3/42* (2006.01)

(52) U.S. Cl.
USPC ............... 455/414.2; 455/3.06; 455/414.1; 455/503

(58) Field of Classification Search
USPC .................... 455/414.1–414.4, 418–420, 455/456.1–456.6
See application file for complete search history.

(56) References Cited

U.S. PATENT DOCUMENTS

| 6,628,928 | B1* | 9/2003 | Crosby et al. | 455/77 |
| 2006/0058997 | A1* | 3/2006 | Wood | 704/233 |
| 2007/0113243 | A1* | 5/2007 | Brey | 725/32 |
| 2007/0250597 | A1* | 10/2007 | Resner et al. | 709/218 |
| 2007/0286169 | A1* | 12/2007 | Roman | 370/352 |
| 2010/0268361 | A1* | 10/2010 | Mantel et al. | 700/94 |
| 2013/0102241 | A1* | 4/2013 | Devine et al. | 455/3.06 |

* cited by examiner

*Primary Examiner* — Kashif Siddiqui
(74) *Attorney, Agent, or Firm* — James M. Wu; JW Law Group (57) ABSTRACT

A network configuration and method of delivering targeted advertisement during an audio broadcasting using a targeted radio advertisement manager ("TRAM") are disclosed. A TRAM process for delivering targeted advertisement ("AD") is able to receive a packet carrying identification ("ID") identifying a radio and a time stamp associated with a tune-in broadcast station via a cellular communication network. After identifying at least one user associated with the radio, a user preference is determined in accordance with the user. After generating a set of targeted ads based on user preference, the set of targeted ads is forwarded to the radio. The targeted ads are selectively disseminated during commercial intervals between radio broadcasting in accordance with a predefined broadcasting schedule.

18 Claims, 5 Drawing Sheets

METHODS AND APPARATUS FOR DELIVERING TARGETED ADVERTISING FOR RADIO LISTENERS

FIELD

The exemplary embodiment(s) of the present invention relates to communications network. More specifically, the exemplary embodiment(s) of the present invention relates to delivery of targeted advertisement to audio listeners.

BACKGROUND

For conventional one-way radio broadcasting such as amplitude modulation ("AM")/frequency modulated ("FM") radio broadcasting, the ability of providing advertisement ("AD") able to target a group of listeners is typically limited. Radio broadcasting typically involves radio stations using one-way radio wave transmission via a radio tower to reach a wide range of geographic area. Any listeners or audience within the geographic area will be able to receive the radio broadcasting. It should be noted that audio broadcast can also be disseminated through cable network, television networks, satellite, and internet radio via Internet.

Conventional radio advertisement is generally targeted to all listeners regardless of demographic data or their individual interests. When a listener is present in the geographical area, he or she will receive the broadcasting program including advertisement. For example, listeners within the geographical area will hear the same AD at a given time on a given station. Different listener has different interest and delivery of an AD to a wrong listener can result in an ineffective AD. For example, a young male listener typically would not be interested in knowing medicine AD targeted to middle-age women. As such, rate of CPM (cost per impression) is typically low because only a portion of listeners are pleased to receive the AD.

SUMMARY

One embodiment of the present invention discloses a network configuration able to deliver targeted advertisement ("AD") during an audio broadcasting using a targeted radio advertisement manager ("TRAM"). A process able to implement TRAM receives a packet or packet stream carrying identification ("ID") of a radio via a cellular communication network. In one embodiment, the packet also contains information regarding a time stamp which is associated with a tune-in broadcast station indicating when the radio is active and which station is tuned in. After identifying at least one user associated with the radio in accordance with user profiles, a user preference is determined in accordance with the user. After generating a set of targeted advertisements ("ADS") based on user preferences, the targeted ADS are forwarded to the radio via the cellular communication network. The targeted ADS are played either in real-time or a scheduled time depending on the applications. The targeted ADS are selectively disseminated during commercial intervals between radio broadcasting program(s) in accordance with a predefined broadcasting schedule.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of employing targeted radio advertisement manager ("TRAM") to deliver targeted advertisement to radio (or audio) listeners during a broadcasting program(s).

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "system" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses a network configuration able to deliver targeted advertisement ("AD") during an audio broadcasting using a targeted radio advertisement manager ("TRAM"). A process of TRAM is able to receive a packet or packet stream carrying identification ("ID") identifying a radio and a time stamp associated with a tune-in broadcast station via a cellular communication network. After identifying at least one user or listener associated with the radio in accordance with a user profile, a user preference is determined in accordance with the user profile. After generating a set of targeted advertisements ("ADS") based on user preferences, the targeted ADS are forwarded to the radio via the cellular communication network. The targeted ADS are played either in real-time or a scheduled time depending on the applications. The targeted ADS are selectively disseminated during commercial breaks or intervals between radio broadcasting in accordance with a predefined broadcasting schedule.

Figure 1:
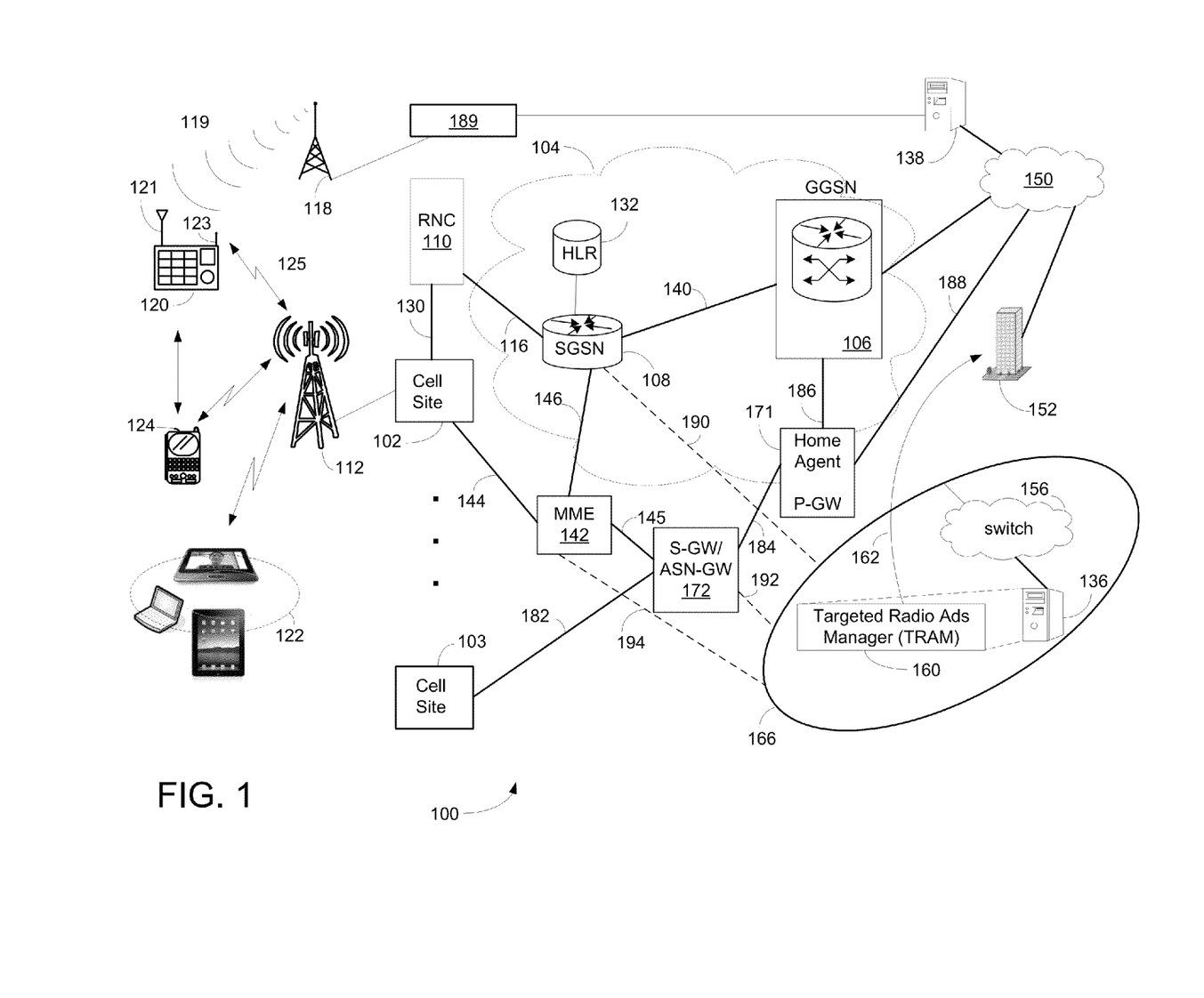
FIG. 1 is a block diagram illustrating a network configuration having one or more network devices configured to provide targeted advertisement ("AD") using targeted radio advertisement manager ("TRAM") in accordance with one embodiment of the present invention.

FIG. 1 is a block diagram 100 illustrating a network configuration having one or more network devices configured to provide targeted ADS using TRAM in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172, and packet data network gateway ("P-GW") or HomeAgent 171. Node 106 is further coupled to Internet, wide area network ("WAN"), or virtual private network ("VPN") 150. Internet, WAN, or VPN provides network communication between node 106 and network devices such as server 138 and service provider(s) such as user profile providers 152. Subscription or service provider 152, in one aspect, is a wireless carrier or search engines responsible for monitoring and managing user subscriptions. Server 138 may be a remote network server capable of providing network communication with radio broadcasting station 189. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), fourth generation ("4G"), LTE (long term evolution), or a combination of 3G and 4G cellular network configuration. To facilitate data transfer between 3G and LTE or between 2G and LTE (or 4G), MME 142, which is coupled to cell site 102 and S-GW 172 via connections 144-145, is used. In the LTE network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and routes data packets between cell site 103 (eNodeB) (or MME) 142 and P-GW 171 via connections 145 and 184. Note that S-GW 172 may be connected to additional network elements such as additional MMEs and/or base stations. In an evolved packet core ("EPC") network environment, S-GW 172 can also be used to perform an anchoring function for mobility between 3G and 4G equipments. S-GW 172, in one aspect, performs various network management functions, such as terminating paths, paging idling UEs, storing data, routing information, generating replica, and the like.

P-GW 171, which is also known as Home Agent, is coupled to S-GW 172, GGSN 106, and Internet 150 via connections 184-188. P-GW 171 is able to provide network communication between an UE and IP based networks such as Internet 150 to perform various network functions, such as connectivity, packet filtering, inspection, data usage, billing, or PCRF (policy and charging rules function) enforcement, et cetera. Similar to S-GW 172, P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Switching network 104 may be referred to as packet core network and cell sites 102-103 may be referred to as radio access networks. It should be noted that the underlying concept of exemplary embodiment would not change when different architecture of switching network is used to work with different networks, such as 3G, 4G, or 5G cellular networks. Switching network 104, in one aspect, includes IP and/or Multi Protocol Label Switching ("MPLS") based network able to operate at a layer of Open Systems Interconnection Basic Reference Model ("OSI model") for information transfer between clients and network servers. Referring back to FIG. 1, network 104, including network nodes 106-108, a home location register ("HLR") 132, routes packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130.

Node 106, in one aspect, can be a gateway GPRS support node ("GGSN") wherein GPRS is a general packet radio service. GGSN 106 includes one or more routers or switches able to selectively manage, monitor, and/or route network traffic or network flows between sources and destinations. Network flow or packet flow, in one example, is a network access initiated by a subscriber and/or a user. Network node or GGSN 106, hereinafter referred to as GGSN, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or hub.

Node 108 is a serving GPRS support node ("SGSN") configured to authenticate portable wireless UEs, registering mobile devices, network usage, et cetera. While SGSN 108 tracks and/or controls mobile communication, GGSN 106 inspects and forwards information and/or packet traffic between mobile terminal(s) and intended destination(s). Alternatively, SGSN 108 is connected to MME 142 which is also able to route packet streams to/from LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a cellular tower 112. Cellular tower 112, which may use multiple radio frequencies or waves, is further coupled to various UEs, such as a radio 120, a handheld device 124, tablets and/or iPad® 122 via wireless communications. Handheld device 124 can be a smart phone, such as iPhone®, BlackBerry®, Android®, and so on. Cell site 102 facilitates network communication between mobile devices such as handheld device 124 and iPad® 122 via cellular tower 112. It should be noted that cell site 102 may include additional cellular towers as well as other land switching circuitry.

Mobile networks are classified into two parts, namely a radio access part such as cell site 102 and core network part such as network 104. The packet core network, which may include a gateway node (SGSN, GGSN), S-GW, P-GW, or the like, allocates the IP address to the mobile device enabling the allocated mobile device to communicate with the global IP. In one example, GGSN acts as a router and the IP address is allocated by a DNS server. GGSN provides a tunnel to the mobile user. In one aspect, the core network or packet core gateway includes accounting and authorization components, such as billing, charging, subscribing, tracking, authorizing, performance, usage, and the like.

Diagram 100 further includes a radio tower 118 used to broadcast AM/FM radio broadcasting via radio waves 119. When radio station 189, for example, wants to broadcast a radio program such as a radio talk show or live footfall game, radio station 189 sends the radio program to radio tower 118. Radio tower 118 broadcasts the radio program which will reach all listeners in a geographic area covered by tower 118. Radio 120, for example, is located within the geographic area covered by tower 118, and can receive radio wave 119 emitted by tower 118 via its radio antenna 121. Note that radio 120 also includes a second antenna 123 which is used to access a cellular network via cellular tower 112.

Referring back to FIG. 1, diagram 100 further includes an AD module 166 containing TRAM 160 and server 136. AD Module 166, in one embodiment, installs TRAM 160 on server 136 which is further coupled to S-GW 172 via an internal network 156. Alternatively, server 136 can directly couple to S-GW 172 without internal network 156. It should be noted that AD module 166 can be hardware, firmware, software, or a combination of hardware, firmware, and software. The modules and/or components of AD module 166 may be placed and/or implemented in a single device or in a multiple network elements such as server 136, S-GW 172, MME 142, SGSN 108, and/or ASN-GW as shown in dotted lines 190-194. Depending on the network applications, AD module 166 can be optionally coupled to SGSN 108 via connection 190, S-GW 172 via connection 192, and/or MME 142 via connection 194.

Upon detecting and receiving a packet or data stream from radio 120 identifying its network ID and a time stamp associated with tuned-in radio station, AD module 166 searches and obtains user (or listener) profile or preferences based on the network ID of radio 120. For example, AD module 166 may have user preferences associated with radio 120 stored in its local memory location. In one embodiment, AD module 166 is able to detect cellular signals from a smart phone such as smart phone 124 which is located in the vicinity of radio 120.

If a smart phone is in the vicinity of radio, it most likely belongs to the listener. A user profile associated to a smart phone user, in one example, can be obtained via various ways including, but not limited to, purchasing from web profile provider(s), social media networks, search engine providers, et cetera. It should be noted that listeners usually have their smart phones with them while listening the radio broadcast. User profile provider such as provider 152 is able to collect user preferences, behaviors, and/or habits in connection to smart phone users. Note that such user profile providers can be web-search providers and/or network providers. As such, TRAM 160 is able to identify users' or listeners' preferences from user profiles obtained from profile providers. Alternatively, listener can also submit his or her interest to TRAM 160.

TRAM 160 generates a set of targeted ADS based on user preference, and sends the ADS to radio 120 via the cellular network via, for example, MME 142 and cell site 102. Alternatively, TRAM 160 is able to obtain targeted ADS from ADS providers who are specializing in targeted radio advertisement platform based on listener preference. It should be noted that upon receipt of targeted ADS, radio 120 replays the targeted ADS in real-time during the commercial breaks. Note that the cellular usage during peak hours can be expensive. To minimize the cost of cellular usage, targeted ADS can alternatively be downloaded to radio 120 during an off-peak time period and store the downloaded ADS in the local storage. The stored targeted ADS will be played later during commercial breaks or intervals in the radio program(s) in accordance with a predefined broadcasting schedule.

An advantage of employing AD module 166 is to improve effectiveness of radio advertisement. Another advantage of using AD module 166 is that it can improve revenue and/or profit because the radio station is able to deliver more targeted ADS whereby CPM rate is enhanced.

Figure 2:
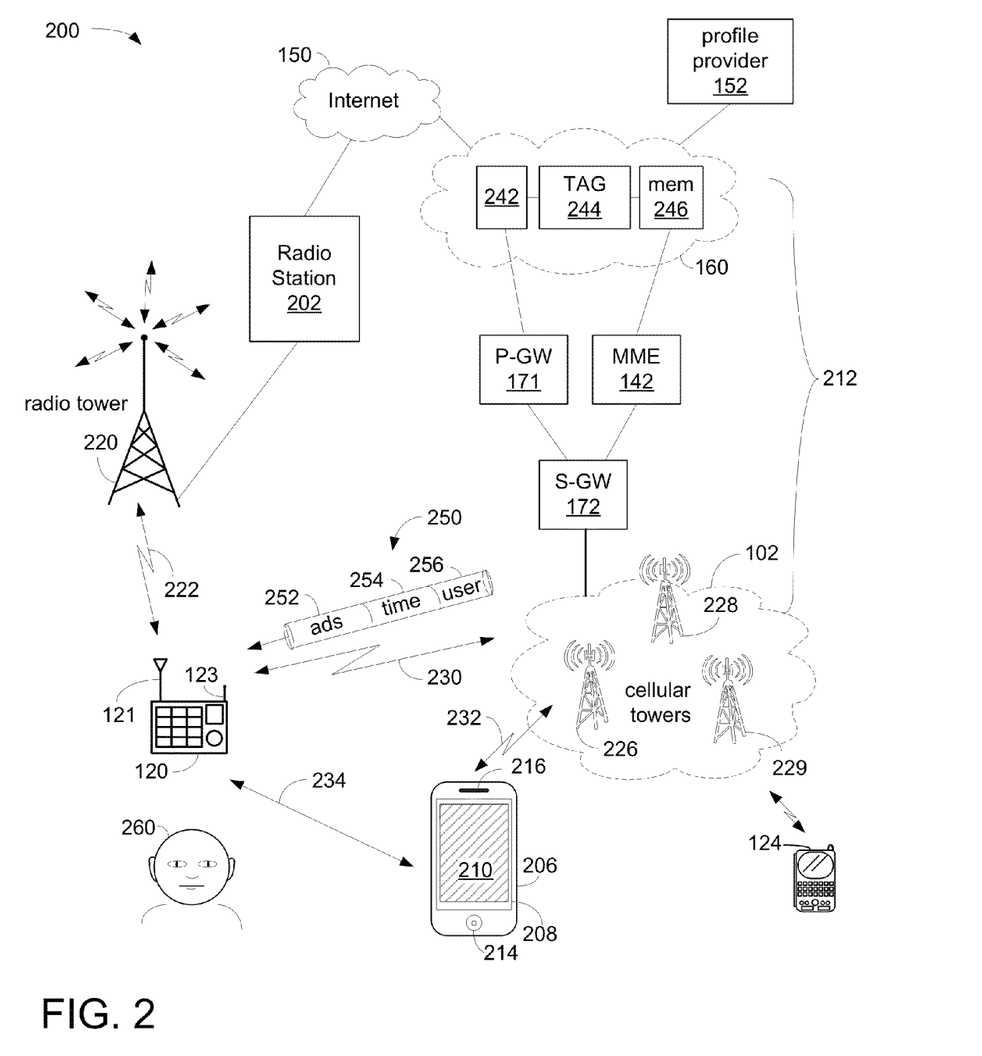
FIG. 2 is a simplified block diagram illustrating a network layout using TRAM to deliver targeted AD in accordance with one embodiment of the present invention.

FIG. 2 is a simplified block diagram 200 illustrating a network layout using TRAM to deliver targeted AD accordance with one embodiment of the present invention. Diagram 200 includes P-GW 171, S-GW 172, MME 142, cell site (or base station) 102, radio station 202, radio 120, smart phones 206 and 124, TRAM 160, and listener 260. TRAM 160, in one aspect, is coupled to radio station 202 via Internet 150. TRAM 160 is also coupled to radio 102 and smart phones via cellular network 212. It should be noted that the underlying concept of the exemplary embodiment(s) of the present invention would not change if one or more blocks (or devices) were added to or removed from diagram 200.

Cell site 102 includes multiple cellular towers such as towers 226-229 and is able to facilitate communication between cellular devices such as radio 120 and smart phone 206. Cell site 102 is also coupled to P-GW 171 and MME 142 via S-GW 172 wherein S-GW 172, in one example, provide communications with different networks. It should be noted that the network layout shown in diagram 200 can be replaced by an alternative network such as 3GPP (3rd Generation Partnership Project) LTE based mobile broadband communications network.

Radio 120, which can also be referred to as an audio device or audio network device, is able to tune in audio broadcasting network 222 using an AM/FM radio receiver with antenna 121. The AM/FM radio receiver receives radio signals broadcasted by radio station 202 via a radio tower 220. Radio 120 includes a 3G/4G (3G or 4G or both) modem having antenna 123 configured to transmit and/or receive wireless signals 230 via cellular communication network 212. For example, the modem of radio 120 is configured to send identification ("ID") packets to TRAM 160. The ID packets carries information relating to radio 120, such as radio's network ID, IP address, time stamps associated to tune-in radio stations, durations for each tune-in, and the like.

Alternatively, the ID packets include information regarding user preferences which may be submitted by listener(s). For example, listener 260 can use radio 120 or smart phone to declare his or her ADS preferences. For instance, listener 260 requests ADS relating to travel, car, computers, or the like. In one embodiment, radio 120 is able to download targeted ADS 250 during off-peak hour(s) via cellular communication network 212 to reduce cellular usage cost, and subsequently stores received targeted ADS 250 in a local storage. Such stored targeted ADS can be played later according to a predefined schedule sent by radio station 202.

Mobile device 206, in one example, includes is a wireless handheld device having a screen 208, button 214, and speaker 216, wherein screen 208 displays a mobile application 210. Mobile device 206 can be a portable wireless UE, such as a smart phone, a laptop, a tablet, and the like, and is connected to a cellular radio network such as radio tower 222 for communicating with P-GW 171 for wireless services.

TRAM 160 includes a user profile locator 242, targeted ADS generator ("TAG") 244, and memory 246. TRAM 160 is able to generate targeted ADS 250 based on user profile(s). After targeted AD or ADS 250 are generated, they are forwarded to radio 120 via cellular network 212 through signals 230 for listener 260. Upon receipt of targeted ADS 250, radio 120 stores the AD in its local storage whereby it can be selectively fetched and played at a later time in accordance with a predefined schedule. Targeted AD may be played in real-time at commercial breaks during a broadcasting program.

TRAM 160 further includes a cellular monitor and a user identifier wherein the cellular monitor is able to detect cellular signals 232 emitted by smart phone 206 which is physically present in the vicinity of radio 120. It is assumed that if a smart phone or cell phone is in the vicinity of radio 120, the smart phone or cell phone is most likely to be listener's phone. The user identifier, in one aspect, activates user profile locator 242 to obtain user profile based on radio ID and smart phone 206. To identify user profile or preference associated with user or listener 260, user profile locator 242 searches and obtains user profile from profile provider(s) 152 in accordance with smart phone 206. Alternatively, user profile locator 242 obtains user preference(s) from listener 260. Once the user profile(s) associated with radio ID are downloaded, TRAM 160, in one embodiment, stores user profile(s) in memory location 246 for later access.

Targeted AD 250, in one embodiment, includes an ADS segment 252, time 254, and user 256. ADS segment 252 contains targeted AD in which listener such as listener 260 will be interested in listening. Time 254 contains information regarding which radio station and what time to play the AD. Time 254, in one aspect, can also be used to indicate that it is a real-time broadcasting. User 256 identifies user or listener 260 associated with radio 120. Note that user 256 may also indicate that the AD in ADS segment 252 is for multiple users.

AM/FM radio 120 includes 3G or 4G modem integrated in the radio as a component. Alternatively, 3G or 4G modem is coupled to radio 120 via USB connection. Upon receipt of targeted ADS sent during the off-peak hour(s), radio 120 stores the targeted ADS in a local storage medium. It should be noted that targeted ADS can be voluminous because AD targets each individual listener or a group of listeners. Different ADS are required for different radio programs at different stations. Also, different geographic area may use different commercial ADS. Accordingly, the data stream for preloading a portion of targeted ADS for each radio station can be fairly large. As such, downloading such data stream during off-peak hours is more economical. It should be noted that service provider air bandwidth can be purchased at whole sale off-peak price for preloading targeted ADS. It should be noted that 3G modem and controller of radio 120 deliver targeted ADS to user(s) based on start and/or stop marks in accordance with predefined schedules.

Profile provider 152, which is also known as targeted radio AD platform provider, can be a company that sells the AD solutions to radio stations. For example, radio stations could sign up for such services with targeted radio AD platform to generate targeted ADS based on user profiles. It should be noted that software logic, such as storing ADS, searching user profiles, machine learning logic, ADS delivery, and so on, can be cloud based software logic.

Figure 3:
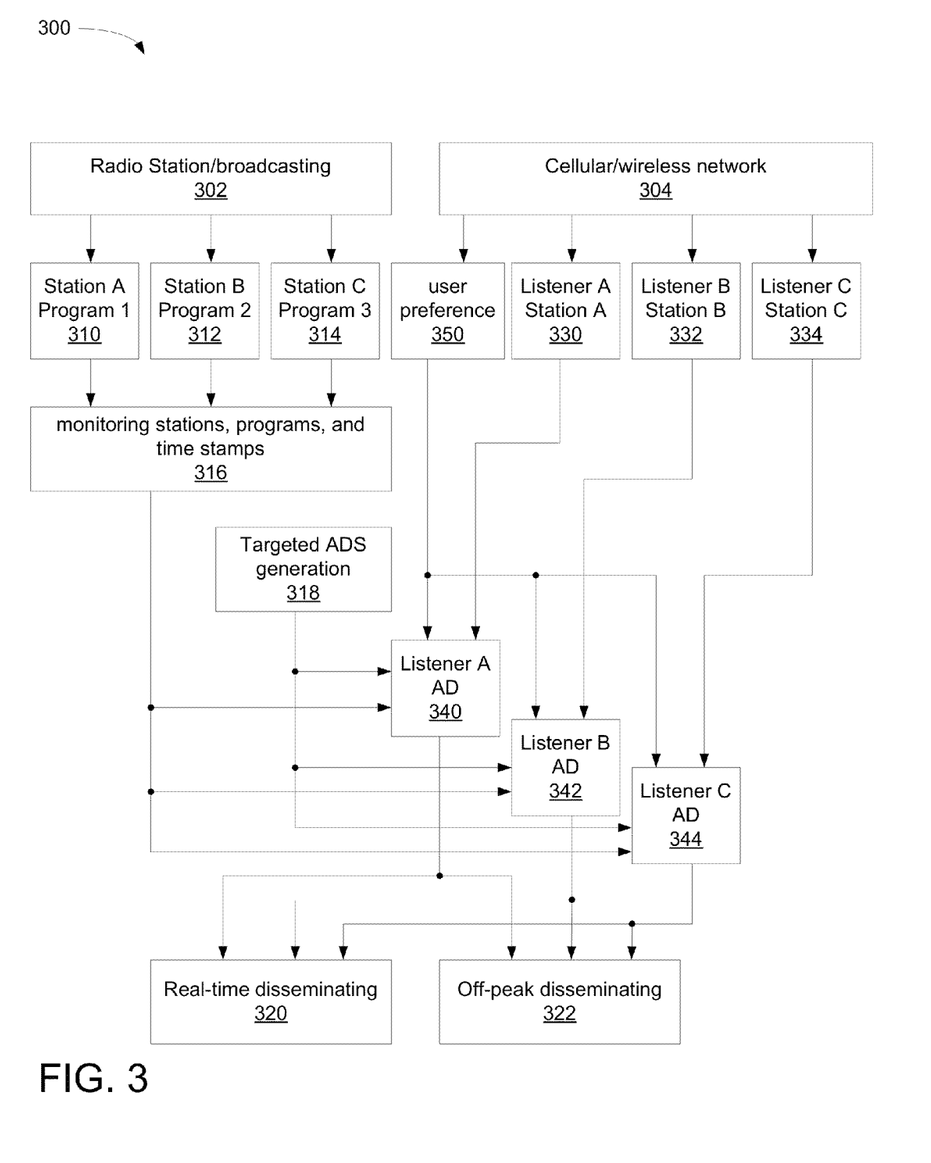
FIG. 3 is a block diagram illustrating a logic flow of TRAM for delivering targeted AD to listeners in accordance with one embodiment of the present invention.

FIG. 3 is a block diagram 300 illustrating a logic flow of TRAM for delivering targeted AD to listeners in accordance with one embodiment of the present invention. Diagram 300 illustrates a logic flow including a radio station and broadcasting block 302, cellular network block 304, and TAG block 318. TRAM, at block 302, is able to tune in radio stations and their programs broadcasted by stations at blocks 310-314, and monitors radio broadcasting. After collecting time stamps associated with radio programs associated with the stations at block 316, the time stamps and program schedules are forwarded to blocks 340-344.

At block 304, TRAM is able to detect listeners who tune in radio stations at block 330-334. User preferences associated to listener A, B, and C are searched and/or obtained at block 350. At block 318, TAG generates listener A AD 340, listener B AD 340, and listener C AD 344 based on users or listeners preferences. Listener A AD 340 is subsequently forwarded to block 320 for real-time AD dissemination according to inputs from blocks 330 and 316. Alternatively, listener A AD 340 is sent to block 322 during off-peak preloading for delayed AD dissemination.

Listener B AD 342 is forwarded to block 320 for real-time AD dissemination according to inputs from blocks 330 and 316. Alternatively, listener B AD 342 is sent to block 322 during off-peak AD preloading for delayed AD dissemination. Similarly, listener C AD 344 is forwarded to block 320 for real-time AD dissemination according to inputs from blocks 330 and 316. Alternatively, listener C AD 344 is sent to block 322 during off-peak preloading for delayed AD dissemination. Note that ADS are delivered to a network AM/FM radio via 3G/4G modem and then stored in the radio. In addition, each radio station may deliver start and stop indicators for AD slots during radio broadcasting. Note that relevant ADS will be downloaded during off-peak hours into the local storage in the radio as indicated at block 322.

Figure 4:
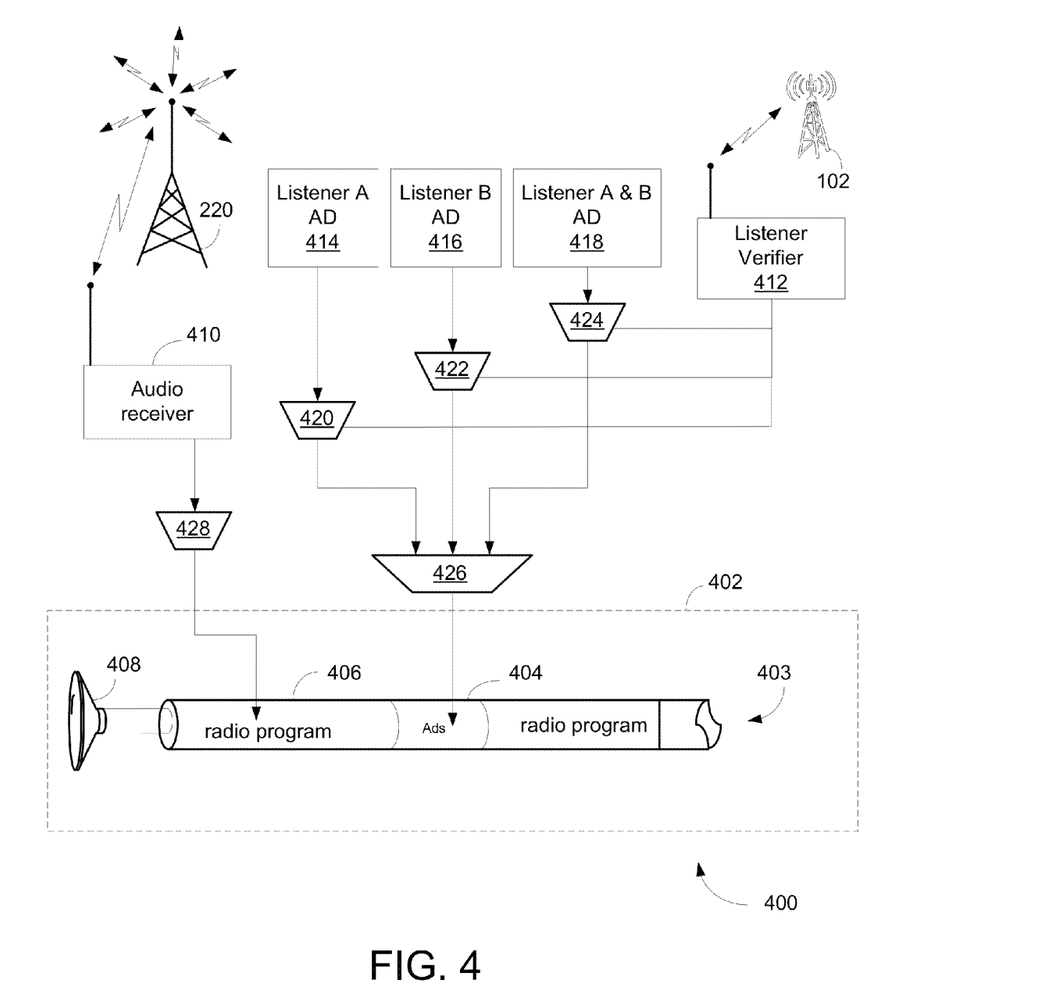
FIG. 4 is a block diagram illustrating a 3G/4G radio capable of delivering targeted AD to listeners in accordance with one embodiment of the present invention.

FIG. 4 is a block diagram 400 illustrating a 3G/4G radio capable of delivering targeted AD in accordance with one embodiment of the present invention. Diagram 400 illustrates an audio receiver 410, listener verifier 412, amplifier component 402, and local storage. The storage stores targeted ADS, such as listener A ADS 414, listener B ADS 416, and listener A&B 418. While audio receiver 410 tunes in radio broadcasting via radio tower 220, listener verifier 412 having a cellular modem is able to verify listener or listeners who is or are listening the radio based on listeners profiles. It should be noted that the underlying concept of the exemplary embodiment(s) of the present invention would not change if one or more blocks (or devices) were added to or removed from diagram 400.

Amplifier component 402, in one embodiment, includes a speaker 408 and information disseminating logic pipe ("IDLP") 403 having multiple radio program sections 406 and ADS sections 404. Based on predefined broadcasting schedules provided by radio stations, amplifier component 402 broadcasts radio program received from radio tower according to broadcasting at radio program section 406 in IDLP 403 via speaker 408. Multiplexer 428 is used to control input of radio waves broadcasted from the radio station. During a commercial break or interval such as ADS section 404, targeted AD is played depending on whether listener A is present, listener B is present, or both listeners A and B are present.

If listener verifier 412 verifies that listener A is present, verifier 412 activates multiplex 420 allowing listener A AD 414 to be played during commercial breaks such as ADS section 404. If, however, listener verifier 412 verifies that listener B is present, verifier 412 activates multiplex 422 allowing listener B AD 416 to be played during commercial break 404. Similarly, if listener verifier 412 verifies that both listeners A and B are present, multiplex 424 is activated to allow listener A&B AD 418 to be played during commercial break 404.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
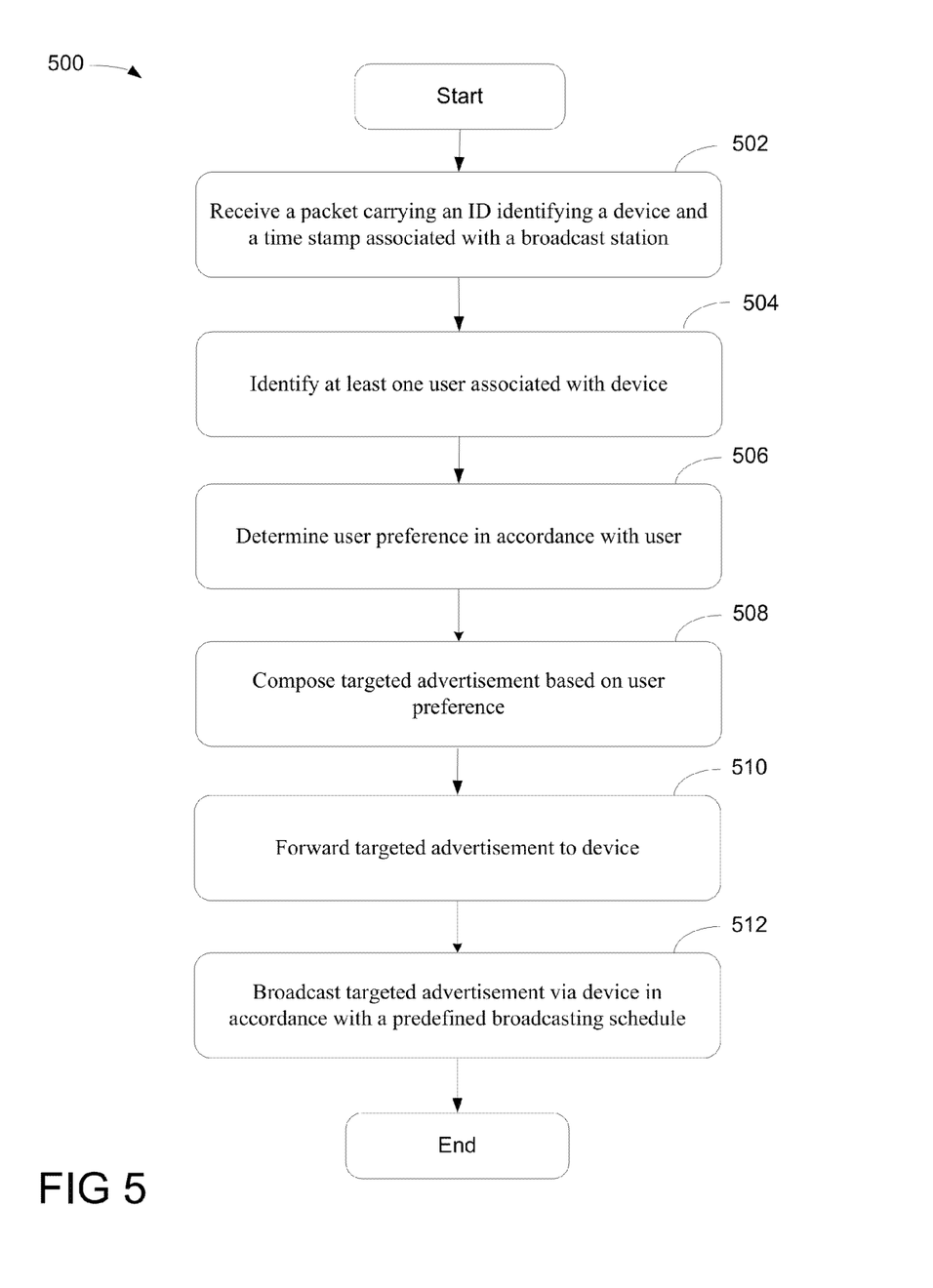
FIG. 5 is a flowchart illustrating an exemplary process of delivering targeted AD using TRAM in accordance with one embodiment of the present invention.

FIG. 5 is a flowchart 500 illustrating an exemplary process of delivering targeted ADS using TRAM in accordance with one embodiment of the present invention. At block 502, a process able to deliver targeted AD during commercial breaks during broadcasting receives a packet carrying a device ID which identifies a network radio and/or time stamps associated with one or more radio stations via a cellular communication network. In one aspect, the radio is an AM/FM radio which also has a cellular modem.

At block 504, at least one user or listener associated with the device or radio is identified. The identity of listener, in one example, is verified via relevant information associated to a cellular smart phone which is present in the vicinity of the AM/FM radio. Note that the identity or preference of the user or listener can be determined through his or her smart phone.

At block 506, user preference is determined based on the identity of user, which is identified via his or her smart phone. The user preference may be obtained through AM/FM radio footprint and the cellular smart phone footprint. Alternatively, the user preference may be obtained through a user profile provider. Note that radio footprint means the habits or preferences of radio station(s) as well as nature of radio programs. The smart phone footprint means user or listener preference which may be collected by various web-based sites based on online search as well as online purchase.

After a set of targeted AD is composed or generated at block 508, targeted AD based on user preference is forwarded to the device or radio at block 510. It should be noted that targeted AD may be sent during an off-peak time period via the cellular communication network.

At block 512, the process is capable of broadcasting targeted AD via the device or radio in accordance with a predefined broadcasting schedule. In one aspect, the process is able to monitor many radios having 3G or 4G cellular communication capabilities. Note that audio program can be disseminated through the radio in accordance with information received from a radio tower and the targeted advisement can be propagated at commercial breaks based on information received from a cellular tower. In one embodiment, while the radio broadcasts audio broadcasting program, targeted ADS are fetched. During commercial breaks or intervals, targeted AD is played.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for delivering targeted advertisement during an audio broadcasting, comprising:
   receiving a packet carrying a device identification ("ID") identifying a device and a time stamp associated with a broadcast station via a cellular communication network;
   identifying at least one user associated with the device;
   determining user preference in accordance with the user;
   composing a set of targeted advertisement based on the user preference;
   forwarding the set of targeted advertisement to the device, wherein forwarding the set of targeted advertisement includes sending the set of targeted advertisement to the device during an off-peak time period of the cellular communication network; and
   broadcasting the set of targeted advertisement via the device in accordance with a predefined broadcasting schedule.

2. The method of claim 1, further comprising monitoring status of a plurality of radios able to broadcast their identities via one of third generation ("3G") and fourth generation ("4G") cellular communication transmitters.

3. The method of claim 2, further comprising monitoring dissemination of audio program through the device in accordance with broadcasting information received from a radio tower and propagating the targeted advisement during a commercial interval based on information received from a cellular tower.

4. The method of claim 1, wherein receiving a packet carrying device identification ("ID") identifying a device includes receiving information sent by a cellular transmitter declaring an identity of an amplitude modulation ("AM")/frequency modulated ("FM") radio.

5. The method of claim 3, wherein identifying at least one user includes detecting a cellular signal emitted by a smart phone which is in vicinity of the AM/FM radio and identifying identity of user based on the smart phone.

6. The method of claim 3, wherein determining user preference includes obtaining the user preference in response to AM/FM radio footprint and the smart phone footprint.

7. The method of claim 1, wherein determining user preference includes obtaining preference from a user profile provider.

8. The method of claim 1, wherein broadcasting the set of targeted advertisement via the device includes:
fetching the set of advertisement from a local storage location;
monitoring audio broadcasting program disseminated via a radio station; and
playing the set of advertisement during a commercial interval of the audio broadcasting program.

9. A method for delivering targeted advertisement during an audio broadcasting, comprising:
receiving a packet carrying a device identification ("ID") identifying a radio and a time stamp associated with a radio station via a cellular communication network;
detecting a plurality of smart phones in vicinity of the radio and identifying a common preference for the plurality of listeners in accordance with a plurality of profiles associated with the users of the plurality of smart phones;
forwarding targeted advertisement based on the common preference to the radio via the cellular communication network; and
broadcasting the targeted advertisement via the radio in accordance with a predefined broadcasting schedule.

10. The method of claim 9, further comprising monitoring activities of a plurality of radios able to identify their identities via one of their third generation ("3G") and fourth generation ("4G") cellular communication capabilities.

11. The method of claim 10, further comprising monitoring dissemination of audio program through the radio in accordance with radio broadcasting received from a radio tower and propagating the targeted advisement during commercial intervals based on information received from a cellular tower.

12. The method of claim 9, wherein receiving a packet carrying device identification ("ID") identifying a radio includes receiving cellular signals informing identity of an amplitude modulation ("AM")/frequency modulated ("FM") radio.

13. The method of claim 9, wherein identifying a common preference for the plurality of listeners includes obtaining the user preference in response to AM/FM radio footprint and the cellular smart phone footprint.

14. The method of claim 13, wherein broadcasting the targeted advertisement includes:
fetching the set of advertisement from a local storage location;
monitoring audio broadcasting program disseminated via the radio station; and
playing the advertisement during a commercial interval of the audio broadcasting program.

15. A network system configured to deliver targeted advertisements, comprising:
an audio device, coupled to an audio broadcasting network, having a first receiver configured to receive radio broadcasting signals broadcasted by an audio broadcast station, and a second receiver configured to receive wireless signals from a cellular communication network; and
a targeted radio advertisements manager ("TRAM") coupled with the audio device and configured to provide targeted advertisement ("AD") during commercial intervals of an audio broadcasting program in response to user profile, wherein the TRAM further includes a cellular monitor configured to detect cellular signals emitted by a smart phone in vicinity of the audio device and a user identifier, coupled to the cellular monitor, and operable to search the user profile from a profile provider in accordance with the cellular signals emitted by the smart phone.

16. The system of claim 15, wherein the audio device is an amplitude modulation ("AM")/frequency modulated ("FM") radio having a third generation ("3G") or fourth generation ("4G") cellular communication capability.

17. The system of claim 16, wherein the AM/FM radio includes a modem configured to identify its network identity and a list of tune-in radio stations via the cellular communication network.

18. The system of claim 17, wherein the AM/FM radio includes a storage configured to store preloaded targeted ADS which is downloaded during an off-peak hours via the cellular communication network.

* * * * *